(12) United States Patent
Day (10) Patent No.: US 7,079,138 B2
(45) Date of Patent: *Jul. 18, 2006

(54) METHOD FOR COMPUTING THE INTENSITY OF SPECULARLY REFLECTED LIGHT

(75) Inventor: Michael R. Day, Santa Monica, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/901,840

(22) Filed: Jul. 28, 2004

(65) Prior Publication Data

US 2005/0001836 A1    Jan. 6, 2005

Related U.S. Application Data

(63) Continuation of application No. 09/935,123, filed on Aug. 21, 2001, now Pat. No. 6,781,594.

(51) Int. Cl.
*G06T 15/50* (2006.01)

(52) U.S. Cl. ..................................... 345/426

(58) Field of Classification Search ............... 345/589, 345/590–592, 426
See application file for complete search history.

(56) References Cited

U.S. PATENT DOCUMENTS

| | | | |
|---|---|---|---|
| 4,241,341 A | 12/1980 | Thorson | |
| 4,361,850 A | 11/1982 | Nishimura | |
| 4,646,075 A | 2/1987 | Andrews et al. | |
| 4,658,247 A | 4/1987 | Gharachorloo | |
| 4,709,231 A | 11/1987 | Sakaibara et al. | |
| 4,737,921 A | 4/1988 | Goldwasser et al. | |
| 4,817,005 A * | 3/1989 | Kubota et al. ............... 700/98 |
| 4,866,637 A | 9/1989 | Gonzalez-Lopez et al. | |
| 4,901,064 A | 2/1990 | Deering | |
| 4,943,938 A | 7/1990 | Aoshima et al. | |
| 5,064,291 A | 11/1991 | Reiser | |
| 5,222,203 A * | 6/1993 | Obata ......................... 345/426 |
| 5,537,638 A * | 7/1996 | Morita et al. ............... 345/426 |
| 5,550,960 A | 8/1996 | Shirman et al. | |
| 5,563,989 A * | 10/1996 | Billyard ..................... 345/426 |
| 5,659,671 A | 8/1997 | Tannenbaum et al. | |
| 5,673,374 A | 9/1997 | Sakaibara et al. | |
| 5,761,401 A | 6/1998 | Kobayashi et al. | |
| 5,805,782 A | 9/1998 | Foran | |
| 5,808,619 A * | 9/1998 | Choi et al. .................. 345/426 |
| 5,812,141 A | 9/1998 | Kamen et al. | |

(Continued)

OTHER PUBLICATIONS

Phong, Bui Tuong, "Illumination for Computer Generated Pictures," Communication of the ACM, 18(6), pp. 311-317, Jun. 1975.

(Continued)

*Primary Examiner*—Ryan Yang
(74) *Attorney, Agent, or Firm*—Carr & Ferrell LLP (57) ABSTRACT

The intensity of specularly reflected light from an illuminated object is represented by an algebraic expression including multiplication, addition, and subtraction operations. The algebraic expression is used in an illumination model, where the illumination model describes the color and intensity of light reflected by the illuminated object. Light reflected by the illuminated object is composed of ambient, diffuse, and specular components. The specular terms used in the illumination model are equivalent in functional form to the diffuse terms, thereby accelerating the computation of color vector c defined by the illumination model. A modified algebraic expression representing specularly reflected light from an illuminated object is defined and used in the illumination model, thereby accelerating computation of color vector c.

20 Claims, 10 Drawing Sheets

U.S. PATENT DOCUMENTS

| | | | |
|---|---|---|---|
| 5,854,632 | A | 12/1998 | Steiner |
| 5,912,830 | A | 6/1999 | Krech, Jr. et al. |
| 5,914,724 | A | 6/1999 | Deering et al. |
| 5,935,198 | A | 8/1999 | Blomgren |
| 5,949,424 | A | 9/1999 | Cabral et al. |
| 6,034,693 | A * | 3/2000 | Kobayashi et al. ......... 345/582 |
| 6,037,947 | A | 3/2000 | Nelson et al. |
| 6,081,274 | A | 6/2000 | Shiraishi |
| 6,141,013 | A | 10/2000 | Nelson et al. |
| 6,181,384 | B1 | 1/2001 | Kurashige et al. |
| 6,252,608 | B1 | 6/2001 | Snyder et al. |
| 6,330,000 | B1 | 12/2001 | Fenney et al. |
| 6,342,885 | B1 | 1/2002 | Knittel et al. |
| 6,400,842 | B1 | 6/2002 | Fukuda |
| 6,611,265 | B1 | 8/2003 | Hong et al. |
| 6,781,594 | B1 | 8/2004 | Day |
| 2002/0080136 | A1 * | 6/2002 | Kouadio ..................... 345/426 |

OTHER PUBLICATIONS

Blinn, J.F., "Models of Light Reflection for Computer Synthesized Pictures," Proc. Siggraph 1977, Computer Graphics 11(2), pp. 92-198, Jul. 1977.

Blinn, J.F., "Light Reflection Functions for Stimulation of Clouds and Dusty Surfaces," ACM Graphics, vol. 16, No. 3, Jul. 1982.

Rushmeier et al., "Extending the Radiosity Method to Include Specularly Reflecting and Translucent Materialsm" ACM Transaction on Graphics, vol. 9, No. 1, Jan. 1990.

Schlicke, C., "A Fast Alternative to Phong's Specular Model," Graphics Gems IV, pp. 385-386, 1994.

* cited by examiner

METHOD FOR COMPUTING THE INTENSITY OF SPECULARLY REFLECTED LIGHT

CROSS REFERENCE TO RELATED APPLICATION

This application is a continuation application and claims the priority benefit of U.S. patent application Ser. No. 09/935,123 entitled "Method for Computing the Intensity of Specularly Reflected Light" filed Aug. 21, 2001 and now U.S. Pat. No. 6,781,594. The disclosure of this commonly owned and assigned application is incorporated herein by reference.

BACKGROUND OF THE INVENTION

1. Field of the Invention

This invention relates generally to computer generated images and more particularly to a method for computing the intensity of specularly reflected light.

2. Description of the Background Art

The illumination of a computer-generated object by colored light sources and ambient light is described by an illumination model. The illumination model is a mathematical expression including ambient, diffuse, and specular illumination terms. The object is illuminated by the reflection of ambient light and the reflection of light source light from the surface of the object. Therefore, the illumination of the object is composed of ambient, diffuse, and specularly reflected light. Given ambient light and light sources positioned about the object, the illumination model defines the reflection properties of the object. The illumination model is considered to be accurate if the illuminated object appears realistic to an observer. Typically, the illumination model is incorporated in a program executed by a rendering engine, a vector processing unit, or a central processing unit (CPU). The program must be capable of computing the illumination of the object when the light sources change position with respect to the object, or when the observer views the illuminated object from a different angle, or when the object is rotated. Furthermore, an efficient illumination model is needed for the program to compute the illumination in real-time, for example, if the object is rotating. Therefore, it is desired to incorporate terms in the illumination model that are computationally cost effective, while at the same time generating an image of the illuminated object that is aesthetically pleasing to the observer.

Ambient light is generalized lighting not attributable to direct light rays from a specific light source. In the physical world, for example, ambient light is generated in a room by multiple reflections of overhead florescent light by the walls and objects in the room, providing an omni-directional distribution of light. The illumination of the object by ambient light is a function of the color of the ambient light and the reflection properties of the object.

Figure 1A:
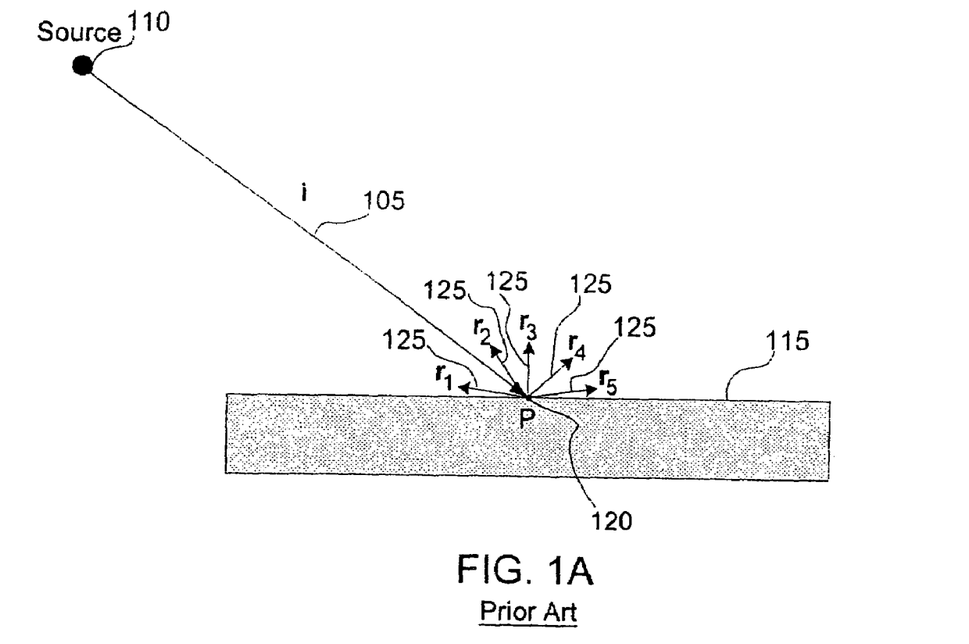
FIG. 1A of the prior art illustrates diffuse reflection from an object's surface.

The illumination of the object by diffuse and specular light depends upon the colors of the light sources, positions of the light sources, the reflection properties of the object, the orientation of the object, and the position of the observer. Source light is reflected diffusely from a point on the object's surface when the surface is rough, scattering light in all directions. Typically, the surface is considered rough when the scale length of the surface roughness is approximately the same or greater than the wavelength of the source light. FIG. 1A illustrates diffuse reflection from an object's surface. A light ray i 105 from a source 110 is incident upon a surface 115 at point P 120, where a bold character denotes a vector. Light ray i 105 is scattered diffusely about point P 120 into a plurality of light rays $r_1$ 125, $r_2$ 125, $r_3$ 125, $r_4$ 125, and $r_5$ 125.

Figure 1B:
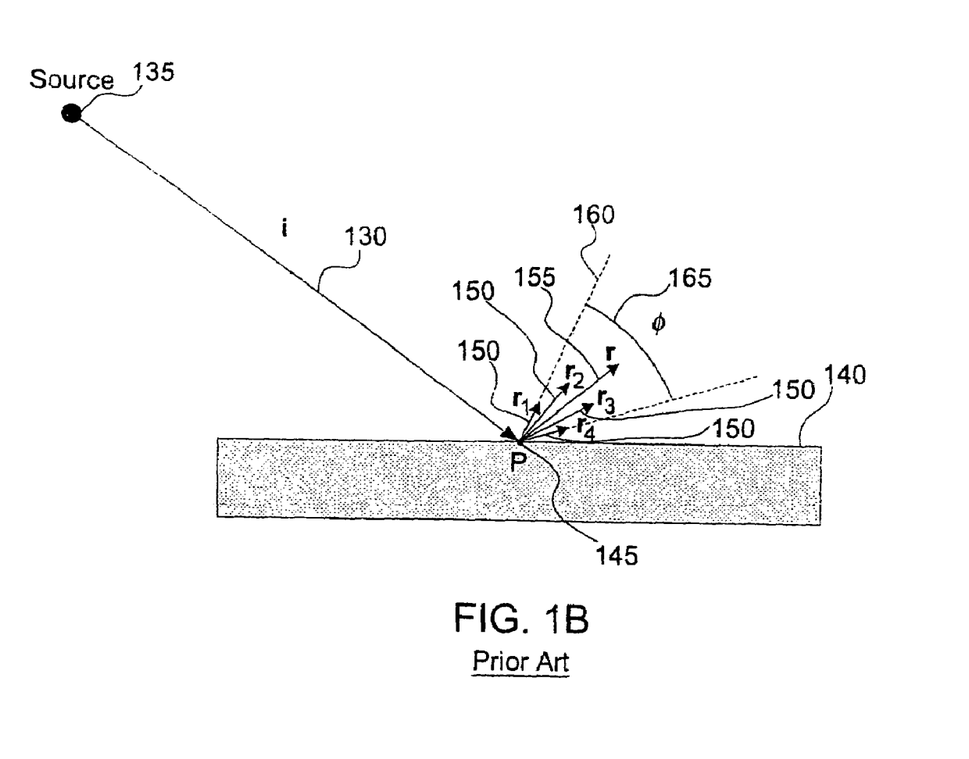
FIG. 1B of the prior art illustrates specular reflection from an object's surface.

If the scale length of the surface roughness is much less than the wavelength of the source light, then the surface is considered smooth, and light is specularly reflected. Specularly reflected light is not scattered omni-directionally about a point on the object's surface, but instead is reflected in a preferred direction. FIG. 1B illustrates specular reflection from an object's surface. A light ray i 130 from a source 135 is incident upon a surface 140 at a point P 145. Light ray i 130 is specularly reflected about point P 145 into a plurality of light rays $r_1$ 150, $r_2$ 150, $r_3$ 150, $r_4$ 150, and $r_5$ 155, confined within a cone 160 subtended by angle $\phi$ 165. Light ray r 155 is the preferred direction for specular reflection. That is, the intensity of specularly reflected light has a maximum along light ray r 155. As discussed further below in conjunction with FIGS. 2A–2B, the direction of preferred light ray r 155 is specified when the angle of reflection is equal to the angle of incidence.

Typically, objects reflect light diffusely and specularly, and in order to generate a realistic illumination of the computer-generated object that closely resembles the real physical object, both diffuse and specular reflections need to be considered.

Figure 2A:
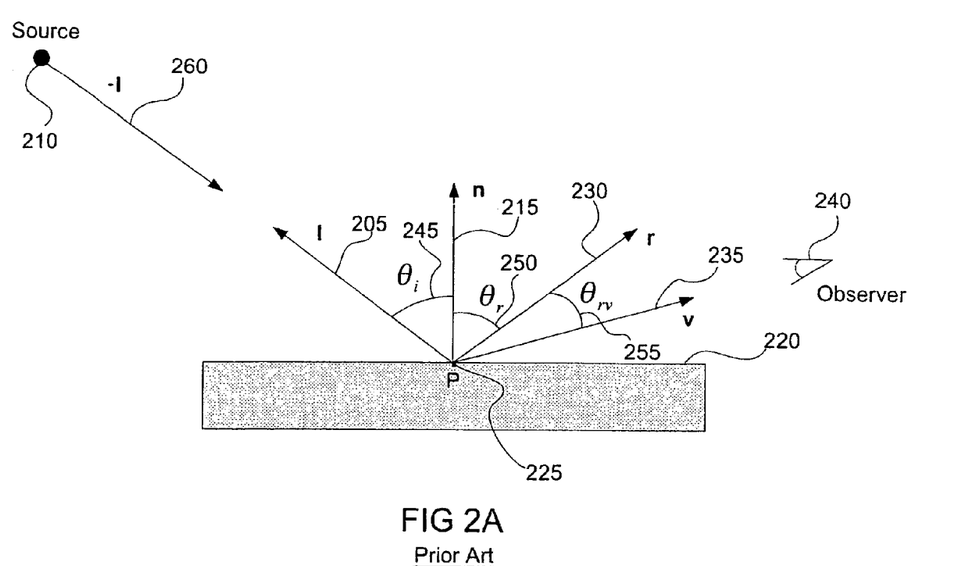
FIG. 2A of the prior art illustrates specular reflection from an object's surface in a preferred direction.

FIG. 2A illustrates specular reflection from an object's surface in a preferred direction, including a unit vector l 205 pointing towards a light source 210, a unit vector n 215 normal to a surface 220 at a point of reflection P 225, a unit vector r 230 pointing in the preferred reflected light direction, a unit vector v 235 pointing towards an observer 240, an angle of incidence $\theta_i$ 245 subtended by the unit vector l 205 and the unit vector n 215, an angle of reflection $\theta_r$ 250 subtended by unit vector n 215 and the unit vector r 230, and an angle $\theta_{rv}$ 255 subtended by unit vector r 230 and unit vector v 235. Light from the source 210 propagates in the direction of a unit vector −l 260, and is specularly reflected from the surface 220 at point P 225. A unit vector is a vector of unit magnitude.

Reflection of light from a perfectly smooth surface obeys Snell's law. Snell's law states that the angle of incidence $\theta_i$ 245 is equal to the angle of reflection $\theta_r$ 250. If surface 220 is a perfectly smooth surface, light from source 210 directed along the unit vector −l 260 at an angle of incidence $\theta_i$ 245 is reflected at point P 225 along unit vector r 230 at an angle of reflection $\theta_r$ 250, where $\theta_i = \theta_r$. Consequently, if surface 220 is a perfectly smooth surface, then light directed along −l 260 from source 210 and specularly reflected at point P 225 would not be detected by observer 240, since specularly reflected light is directed only along unit vector r 230. However, a surface is never perfectly smooth, and light directed along −l 260 from source 210 and specularly reflected at point P 225 has a distribution about unit vector r 230, where unit vector r 230 points in the preferred direction of specularly reflected light. The preferred direction is specified by equating the angle of incidence $\theta_i$ 245 with the angle of reflection $\theta_r$ 250. In other words, specular reflection intensity as measured by observer 240 is a function of angle $\theta_{rv}$ 255, having a maximum reflection intensity when $\theta_{rv} = 0$ and decreasing as $\theta_{rv}$ 255 increases. That is, observer 240 viewing point P 225 of the surface 220 detects a maximum in the specular reflection intensity when unit vector v 235 is co-linear with unit vector r 230, but as observer 240 changes position and angle $\theta_{rv}$ 235 increases, observer 240 detects decreasing specular reflection intensities.

A first prior art method for computing the intensity of specularly reflected light is to represent the specular intensity as $f(r,v,n) \propto (r \cdot v)^n$, where $1 \leq n \leq \infty$ and n is a parameter that describes the shininess of the object. Since r and v are unit vectors, the dot product $r \cdot v = \cos \theta_{rv}$, and therefore, $f(r,v,n) \propto \cos^n \theta_{rv}$.

Figure 2B:
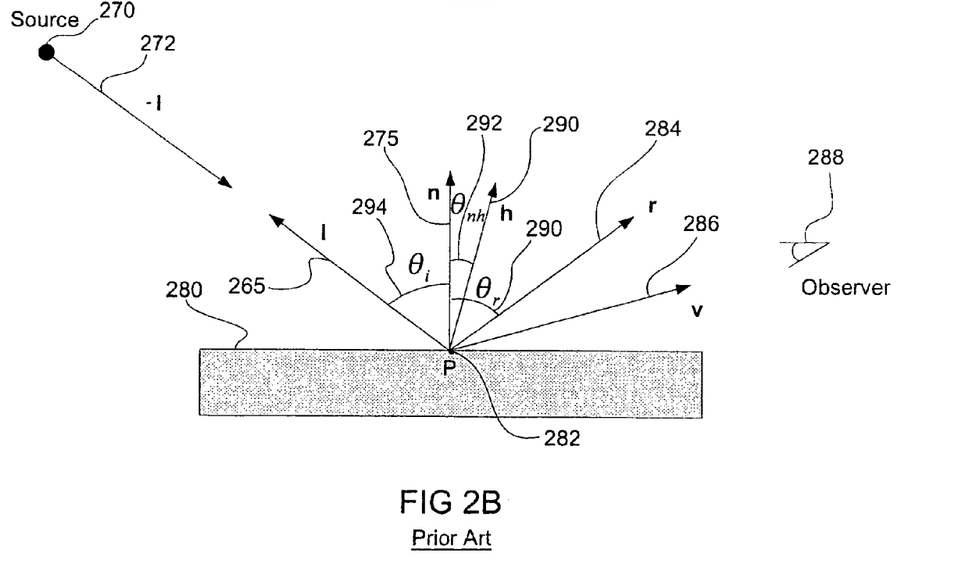
FIG. 2B of the prior art illustrates another embodiment of specular reflection from an object's surface in a preferred direction.

A second prior art method computes the intensity of specularly reflected light in an alternate manner. For example, FIG. 2B illustrates another embodiment of specular reflection from an object's surface in a preferred direction, including a unit vector l 265 pointing towards a light source 270, a unit vector n 275 normal to a surface 280 at a point of reflection P 282, a unit vector r 284 pointing in the preferred reflected light direction, a unit vector v 286 pointing towards an observer 288, a unit vector h 290 bisecting the angle subtended by the unit vector l 265 and the unit vector v 286, an angle of incidence $\theta_i$ 294, an angle of reflection $\theta_r$ 290, and an angle $\theta_{nh}$ 292 subtended by the unit vector h 290 and the unit vector n 275. Light from the source 270 propagates in the direction of a unit vector −l 272. The angle of incidence $\theta_i$ 294 is equal to the angle of reflection $\theta_r$ 290. The specular intensity is represented as $g(n,h,n) \propto (n \cdot h)^n$, where $1 \leq n \leq \infty$ and n is a parameter that describes the shininess of the object. Since n and h are unit vectors, the dot product $n \cdot h = \cos \theta_{nh}$, and therefore, $g(n,h,n) \propto \cos^n \theta_{nh}$. When the surface 280 is rotated such that unit vector n 275 is co-linear with unit vector h 290, then $\cos \theta_{nh} = 1$, the specular intensity $g(n,h,n)$ is at a maximum, and therefore the observer 288 detects a maximum in the specularly reflected light intensity. The second prior art method for computing the intensity of specular reflection has an advantage over the first prior art method in that the second prior art method more closely agrees with empirical specular reflection data.

The first and second prior art methods for computing the intensity of specularly reflected light are computationally expensive compared to the calculation of the diffuse and ambient terms that make up the remainder of the illumination model. Specular intensity as defined by the prior art is proportional to $\cos^n \theta$, where $\theta \equiv \theta_{rv}$ or $\theta \equiv \theta_{nh}$. The exponential specular intensity function $\cos^n \theta$ can be evaluated for integer n, using n−1 repeated multiplications, but this is impractical since a typical value of n can easily exceed 100. If the exponent n is equal to a power of two, for example $n = 2^m$, then the specular intensity may be calculated by m successive squarings. However, the evaluation of specular intensity is still cost prohibitive. If n is not an integer, then the exponential and logarithm functions can be used, by evaluating $\cos^n \theta$ as $e^{(n \ln(\cos \theta))}$, but exponentiation is at least an order of magnitude slower than the operations required to compute the ambient and diffuse illumination terms.

A third prior art method of computing specular intensity is to replace the exponential specular intensity function with an alternate formula that invokes a similar visual impression of an illuminated object, however without exponentiation. Specular intensity is modeled by an algebraic function $h(t,n) = t/(n - nt + t)$, where either $t = \cos \theta_{rv}$ or $t = \cos \theta_{nh}$, and n is a parameter that describes the shininess of the object. The algebraic function $h(t,n)$ does not include exponents, but does include multiplication, addition, subtraction, and division operators. These algebraic operations are usually less costly than exponentiation. However, while the computation time has been reduced, in many computer architectures division is still the slowest of these operations.

It would be useful to implement a cost effective method of calculating specular intensity that puts the computation of the specular term on a more even footing with the computation of the ambient and diffuse terms, while providing a model of specular reflection that is aesthetically pleasing to the observer.

SUMMARY OF THE INVENTION

In accordance with the present invention, an algebraic method is disclosed to compute the intensity of specularly reflected light from an object illuminated by a plurality of light sources. The plurality of light sources include point light sources and extended light sources. The algebraic expression $S_i(n,h_i,n) = 1 - n + \max\{n \cdot (nh_i), n-1\}$ represents the intensity of light reflected from a point on the object as measured by an observer, the object illuminated by an $i^{th}$ light source. The algebraic expression includes multiplication, addition, and subtraction operators. The algebraic expression approximates the results of prior art models of specular reflection intensity, but at lower computational costs.

The algebraic expression for specular intensity is substituted into an illumination model, where the illumination model includes ambient, diffuse, and specular illumination terms. The illumination model is incorporated into a software program, where the program computes a color vector c representing the color and intensity of light reflected by an object illuminated by a plurality of light sources. The reflected light is composed of ambient, diffuse, and specular components. The specular terms in the illumination model are equivalent in functional form to the diffuse terms, thereby providing an efficient and inexpensive means of computing the specular component of the color vector c. That is, a vector-based hardware system that computes and sums the ambient and diffuse terms can be used to compute and sum the ambient, diffuse, and specular terms at very little additional cost.

A modified algebraic expression $SM_{i,k}(n,h_i,n) = (1 - n/k + \max\{n \cdot (n/k\ h_i), n/k - 1\})^k$ represents the intensity of light reflected from a point on the object, where the object is illuminated by the $i^{th}$ light source, and $2 \leq k \leq n$. The first (k−1) derivatives of the modified algebraic expression $SM_{i,k}(n,h_i,n)$ are continuous, and therefore by increasing the value of k, the modified algebraic expression more closely approximates the prior art specular intensity functions, but at a lower computational cost.

DETAILED DESCRIPTION OF THE DRAWINGS

Figure 3:
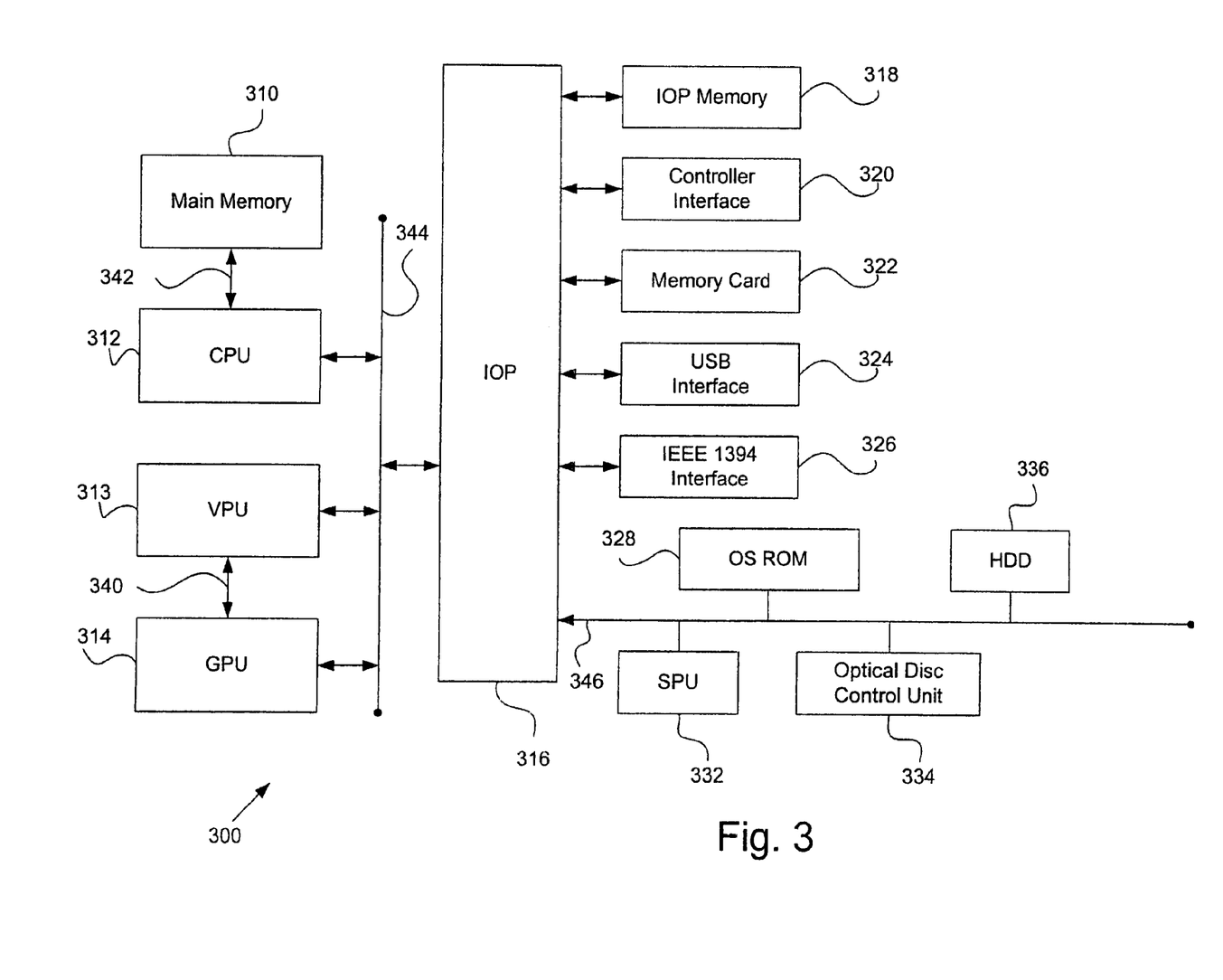
FIG. 3 is a block diagram of one embodiment of an electronic entertainment system in accordance with the invention.

FIG. 3 is a block diagram of one embodiment of an electronic entertainment system 300 in accordance with the invention. System 300 includes, but is not limited to, a main memory 310, a central processing unit (CPU) 312, a vector processing unit VPU 313, a graphics processing unit (GPU) 314, an input/output processor (IOP) 316, an IOP memory 318, a controller interface 320, a memory card 322, a Universal Serial Bus (USB) interface 324, and an IEEE 1394 interface 326. System 300 also includes an operating system read-only memory (OS ROM) 328, a sound processing unit (SPU) 332, an optical disc control unit 334, and a hard disc drive (HDD) 336, which are connected via a bus 346 to IOP 316.

CPU 312, VPU 313, GPU 314, and IOP 316 communicate via a system bus 344. CPU 312 communicates with main memory 310 via a dedicated bus 342. VPU 313 and GPU 314 may also communicate via a dedicated bus 340.

CPU 312 executes programs stored in OS ROM 328 and main memory 310. Main memory 310 may contain prestored programs and may also contain programs transferred via IOP 316 from a CD-ROM or DVD-ROM (not shown) using optical disc control unit 334. IOP 316 controls data exchanges between CPU 312, VPU 313, GPU 314 and other devices of system 300, such as controller interface 320.

Main memory 310 includes, but is not limited to, a program having game instructions including an illumination model. The program is preferably loaded from a CD-ROM via optical disc control unit 334 into main memory 310. CPU 312, in conjunction with VPU 313, GPU 314, and SPU 332, executes game instructions and generates rendering instructions using inputs received via controller interface 320 from a user. The user may also instruct CPU 312 to store certain game information on memory card 322. Other devices may be connected to system 300 via USB interface 324 and IEEE 1394 interface 326.

VPU 313 executes instructions from CPU 312 to generate color vectors associated with an illuminated object by using the illumination model. SPU 332 executes instructions from CPU 312 to produce sound signals that are output on an audio device (not shown). GPU 314 executes rendering instructions from CPU 312 and VPU 313 to produce images for display on a display device (not shown). That is, GPU 314, using the color vectors generated by VPU 313 and rendering instructions from CPU 312, renders the illuminated object in an image.

Figure 4A:
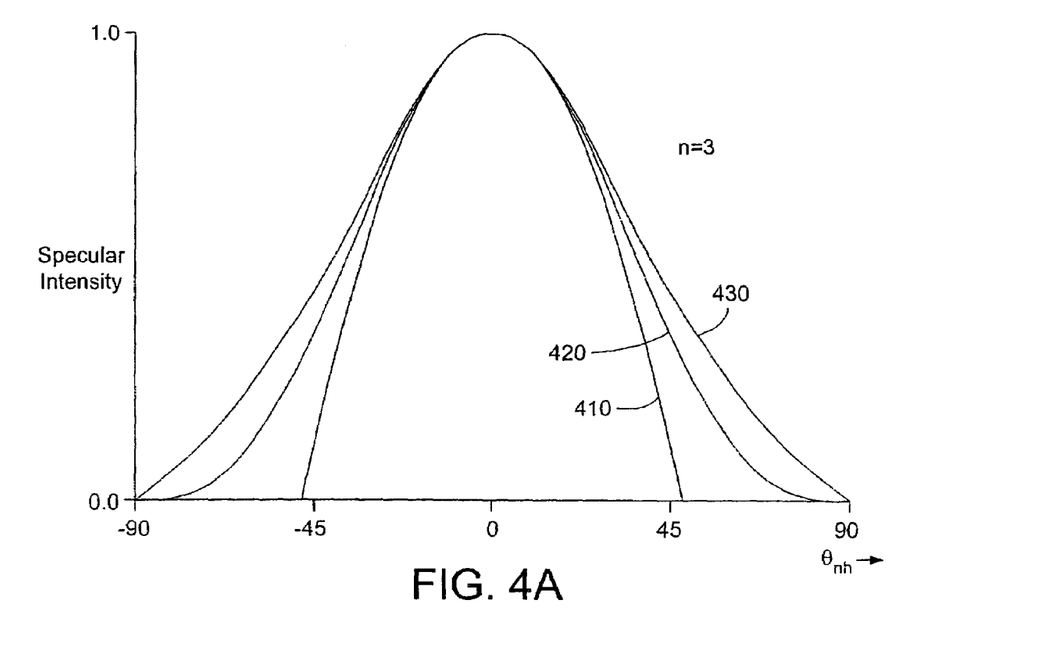
FIG. 4A is a graph of the specular intensity function $S(n,h,n)$ according to the invention, the specular intensity function $g(n,h,n)$ of the prior art, and the specular intensity function $h(n,h,n)$ of the prior art, for n=3.
Figure 4B:
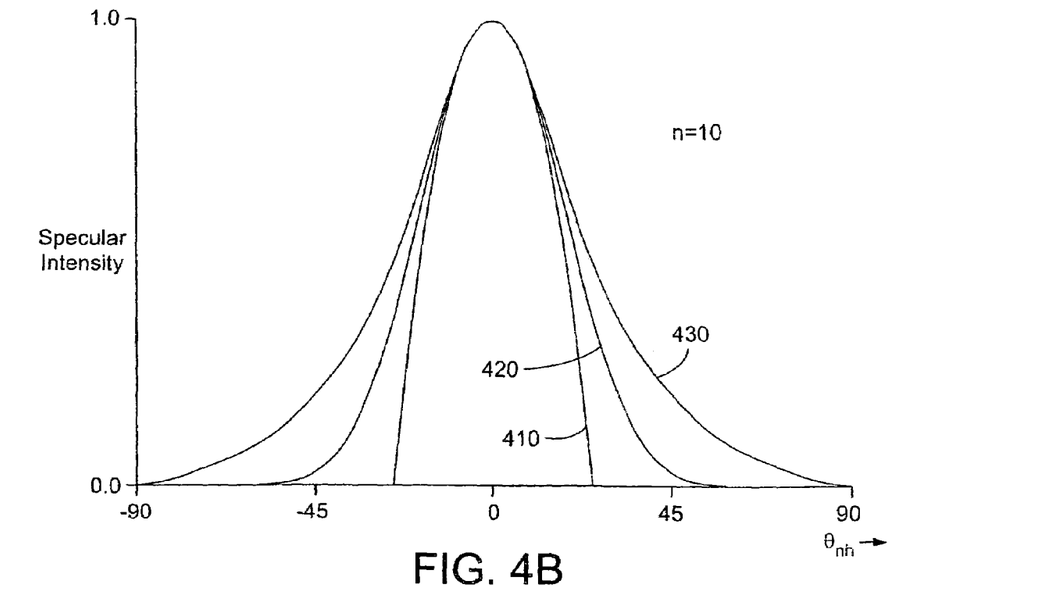
FIG. 4B is a graph of the specular intensity function $S(n,h,n)$ according to the invention, the specular intensity function $g(n,h,n)$ of the prior art, and the specular intensity function $h(n,h,n)$ of the prior art, for n=10.
Figure 4C:
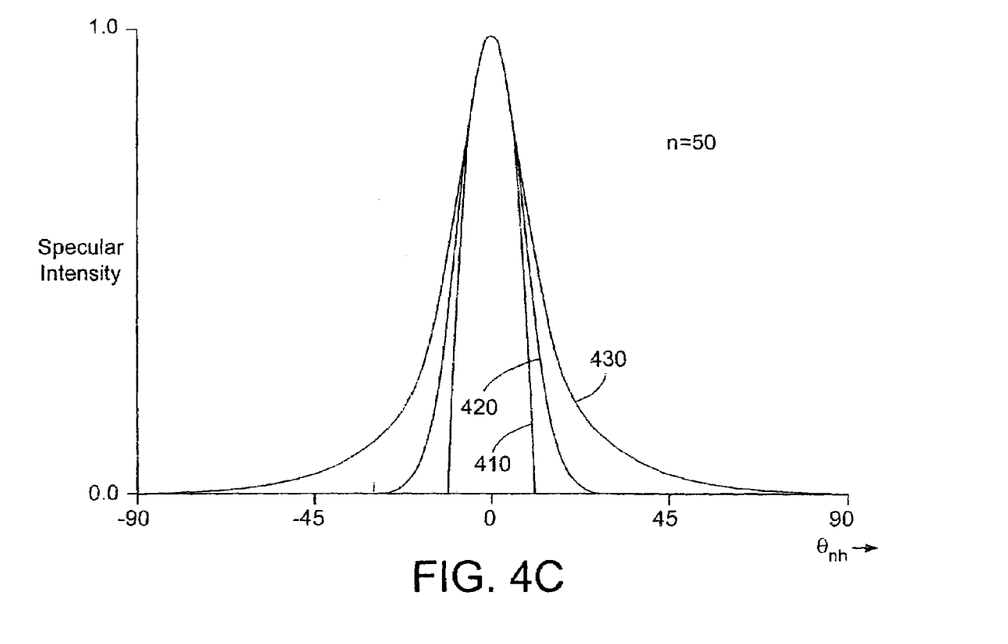
FIG. 4C is a graph of the specular intensity function S(n,h,n) according to the invention, the specular intensity function g(n,h,n) of the prior art, and the specular intensity function h(n,h,n) of the prior art, for n=50.
Figure 4D:
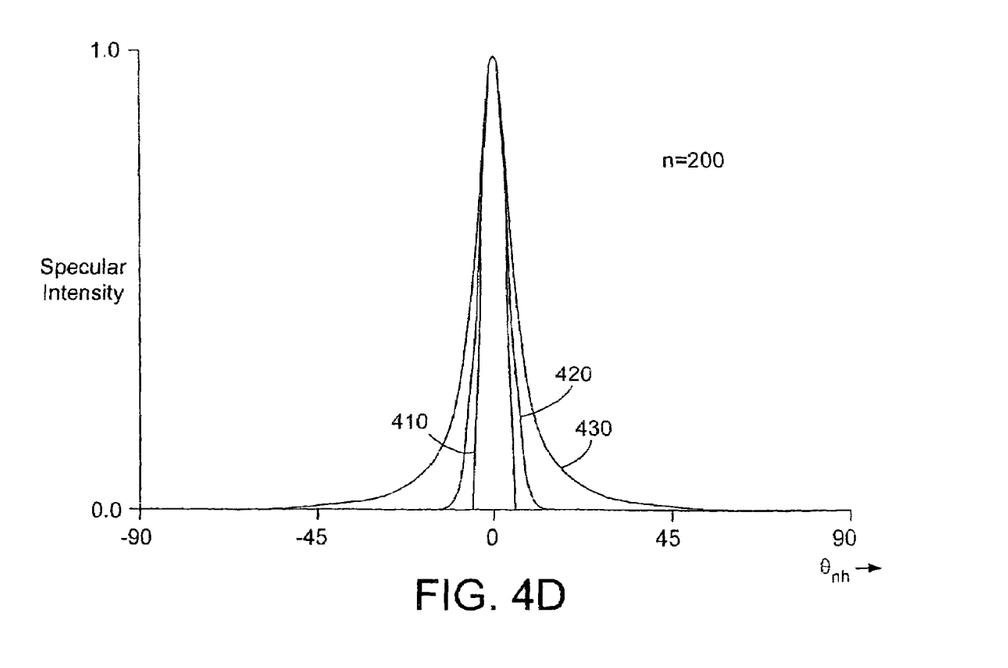
FIG. 4D is a graph of the specular intensity function S(n,h,n) according to the invention, the specular intensity function g(n,h,n) of the prior art, and the specular intensity function h(n,h,n) of the prior art, for n=200.

The illumination model includes ambient, diffuse, and specular illumination terms. The specular terms are defined by substituting a specular intensity function into the illumination model. In the present invention, specular intensity is modeled by the function S, where S(n,h,n)=1−n+max{n·(nh), n−1} and the function max{n·(nh), n−1} selects the maximum of n·(nh) and n−1. The unit vector n 275 and the unit vector h 290 are described in conjunction with FIG. 2B, and n is the shininess parameter. When unit vector n 275 is co-linear with unit vector h 290 and $\theta_{nh}$=0, max{n·(nh), n−1}=max{n, n−1}=n, and S(n,h,n)=(1−n)+n=1. In other words, S is at a maximum when unit vector n 275 is co-linear with unit vector h 290. However, when unit vector n 275 is not co-linear with unit vector h 290 and when the condition n·(nh)≦n−1 is satisfied, then max{n·(nh), n−1}=n−1, and S(n,h,n)=(1−n)+(n−1)=0. In other words, S(n,h,n)=0 when n·(nh)≦n−1. Since n·(nh)=n(cos $\theta_{nh}$), S(n,h,n)=0 when cos $\theta_{nh}$≦1−1/n. That is, S(n,h,n)=0 for $\theta_{nh}$≧|arcos(1−1/n)| and for $\theta_{nh}$≦−|arcos(1−1/n)|, where the function |(arg)| generates the absolute value of the argument (arg). In contrast to the prior art specular intensity functions, specular intensity function S does not include exponentiation nor does function S include a division. Therefore, computing function S is less costly than computing the prior art specular intensity functions. In addition, the graph of function S is similar to the prior art specular intensity functions, thereby providing a reasonable model for specular reflection. For example, FIG. 4A is a graph of the specular intensity function S(n,h,n) 410 according to the present invention, the second prior art specular intensity function g(n,h,n) 420, and the third prior art specular intensity function h(n,h,n) 430, plotted as functions of angle $\theta_{nh}$ 292. The shininess parameter n=3. All curves have maximum specular intensity when $\theta_{nh}$=0. The maximum specular intensity of each curve is equal to 1.0, and the minimum specular intensity of each curve is equal to zero. In addition, each curve is a continuous function of $\theta_{nh}$. FIG. 4B is a graph of the functions S(n,h,n) 410, g(n,h,n) 420, and h(n,h,n) 430 for n=10, FIG. 4C is a graph of the functions for n=50, and FIG. 4D is a graph of the functions for n=200. Note that as the shininess parameter n increases, the width of each function decreases, where the width of each function can be measured at a specular intensity value of 0.5, for example. The relation between the width of the specular intensity function and the shininess parameter n is explained further below in conjunction with FIG. 5.

Figure 5:
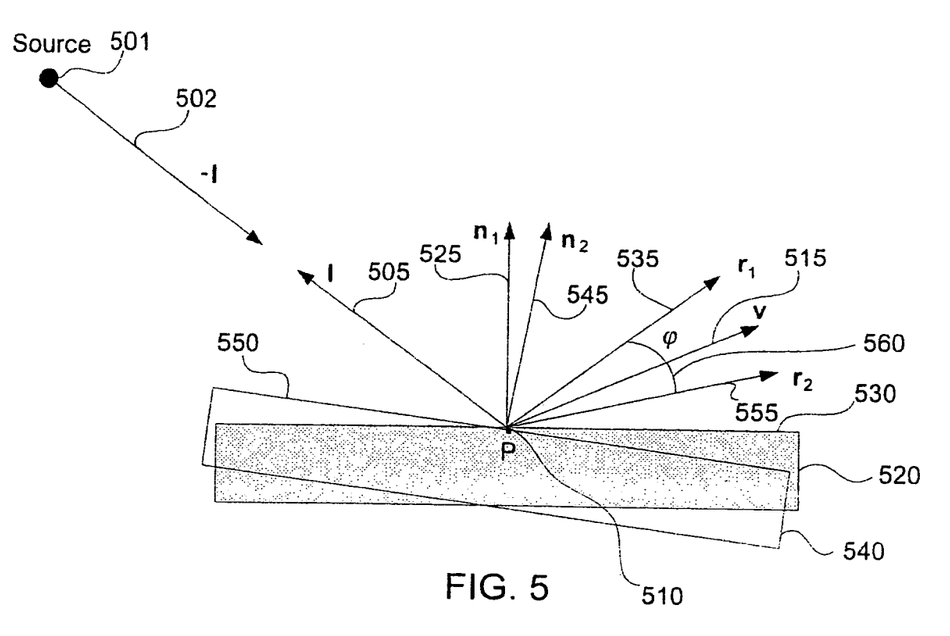
FIG. 5 illustrates preferred directions of specular reflection for two orientations of a surface, according to the invention.

FIG. 5 illustrates preferred directions of specular reflection for two orientations of a surface. Unit vector l 505 points towards a light source 501. Light travels from the light source 501 along a unit vector −l 502, and is reflected from point P 510. Unit vector v 515 points towards an observer (not shown). Unit vector v 515 and unit vector l 505 are constant since source 401 and the observer (not shown) are stationary. Given a first orientation of an object 520 with a unit vector $n_1$ 525 normal to a surface 530, light directed along −l 502 is maximally specularly reflected along a unit vector $r_1$ 535. Given a second orientation of the object 540 with a unit vector $n_2$ 545 normal to a surface 550, light directed along −l 502 is maximally specularly reflected along a unit vector $r_2$ 555. Angle $\phi$560 defines the region about unit vector v 515 in which the intensity of specularly reflected light measured by the observer located along unit vector v 515 is greater than 0.5. If object 520 is rotated such that unit vector $r_1$ 535 is directed along unit vector v 515, then the observer measures a maximum specular intensity of 1.0. If n is large, then the material is extremely shiny, $\phi$560 is small, and the specularly reflected light is confined to a relatively narrow region about unit vector v 515. If n is small, then the material is less shiny, $\phi$560 is large, and the specularly reflected light is confined to a wider region about unit vector v 515.

Therefore, specular intensity function S according to the present invention properly models the shininess of an object as embodied in the shininess parameter n.

As will be discussed further below in conjunction with FIG. 7, an additional advantage of the present invention's model for specularly reflected light intensity is the similarity in form of the specular terms to the ambient and diffuse terms in the illumination model. Thus, a vector-based hardware system that computes and sums the ambient and diffuse terms can be used to compute and sum the ambient, diffuse, and specular terms at very little additional cost.

Figure 6:
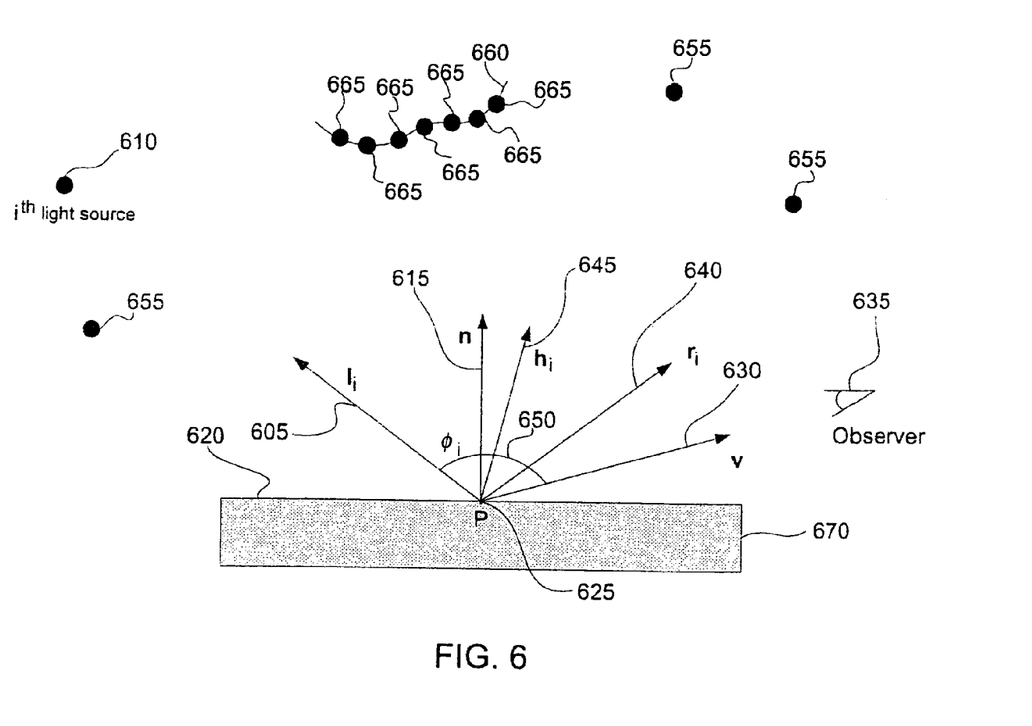
FIG. 6 illustrates illumination of an object by a plurality of light sources, according to the invention.

FIG. 6 illustrates illumination of an object by a plurality of light sources, including a unit vector $l_i$ 605 pointing towards an $i^{th}$ light source 610, a unit vector n 615 normal to a surface 620 at a point of reflection P 625, a unit vector v 630 pointing towards an observer 635, a unit vector $r_i$ 640 pointing in the preferred specular reflection direction, and a unit vector $h_i$ 645 bisecting the angle $\phi_i$ 650 subtended by the unit vector $l_i$ 605 and the unit vector v 630. In addition, FIG. 6 includes a plurality of point light sources 655 and an extended light source 660. Only one extended light source 660 is shown, although the scope of the invention encompasses a plurality of extended light sources. The extended light source 660 is composed of a plurality of point light sources 665. Specular intensity is modeled by a function $S_i = 1 - n + \max\{n \cdot (nh_i), n-1\}$, according to the present invention, where $S_i$ is the specular intensity of point P 625 illuminated by the $i^{th}$ light source 610, and detected by the observer 635.

Diffuse intensity is modeled by the function $D_i = \max\{n \cdot l, 0\}$ of the prior art, where $D_i$ is the diffuse intensity of point P 625 illuminated by the $i^{th}$ light source 610, and detected by observer 635. Given specular intensity $S_i$, diffuse intensity $D_i$, and ambient light, an illumination model for a resulting color vector c is defined. The color vector c is a vector in (R,G,B)-space and is used to describe the resulting color and light intensity of an illuminated object viewed by an observer, due to specular, diffuse, and ambient light reflection.

Figure 7:
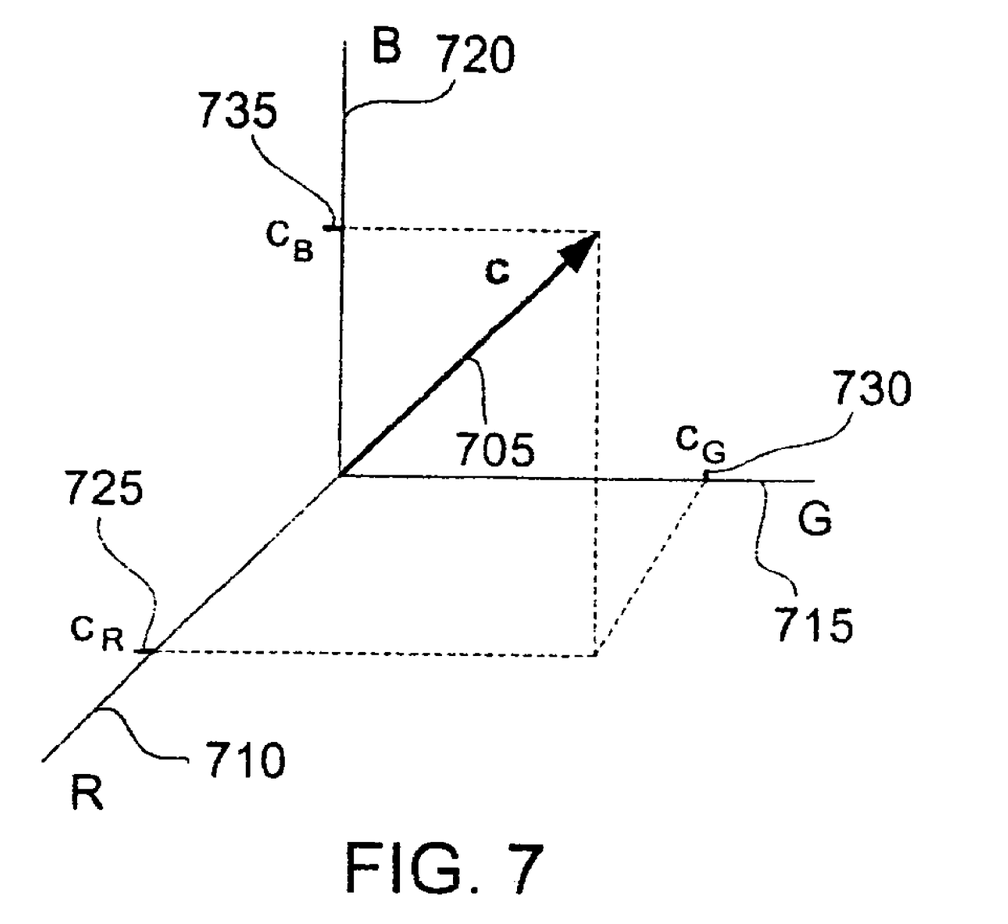
FIG. 7 illustrates one embodiment of color vector c in (R,G,B)-space, according to the invention.

FIG. 7 illustrates one embodiment of color vector c 705 in (R,G,B)-space, defined by a Cartesian coordinate system including a red (R) axis 710, a green (G) axis 715, and a blue (B) axis 720. Color vector c 705 has a component $c_R$ 725 along the R axis 710, a component $c_G$ 730 along the G axis 715, and a component $c_B$ 735 along the B axis 720. The value of the components $c_R$ 725, $c_G$ 730, and $c_B$ 735 of color vector c 705 determine the color of the reflected light, and the magnitude of color vector c 705 determines the intensity of the reflected light.

Given M light sources, the equation for color vector c 705 of the present invention is written as $$c = k_d \otimes (c_a + \sum_{i=1}^{M} D_i c_i) + k_s \otimes \sum_{i=1}^{M} S_i c_i,$$

where $k_d$, $k_s$ are diffuse and specular reflection coefficient vectors, respectively, $c_a$ is the color of the ambient light, and $c_i$ is the color of the $i^{th}$ light source 610. Vectors $c_a$ and $c_i$ are vectors in (R,G,B)-space. The summation symbol is used to sum the index i over all M light sources, and the symbol $\otimes$ operates on two vectors to give the component-wise product of the two vectors.

Substituting the diffuse intensity $D_i$ and the specular intensity $S_i$ into the equation for color vector c, and rearranging terms, the equation can be written as $$c = a + \sum_{j=1}^{2} \sum_{i=1}^{M} \max(n \cdot u_{ji}, m_{ji}) c_{ji}.$$

The vector a includes an ambient color vector. The sum over index i for j=1 is a summation over all the diffuse color vectors generated by the M light sources, and the sum over index i for j=2 is a summation over all the specular color vectors generated by the M light sources. For example, $u_{1i}=l_i$, $m_{1i}=0$, and $c_{1i}=k_d c_i$ are the diffuse terms that generate the diffuse color vector for the $i^{th}$ light source, and $u_{2i}=nh_i$, $m_{2i}=n-1$, and $c_{2i}=k_s c_i$ are the specular terms that generate the specular color vector for the $i^{th}$ light source.

Each term in the summation over i and j in the expression for the color vector c has the same form. In other words, the specular illumination term $\max(n \cdot u_{2i}, m_{2i})$ for the $i^{th}$ light source has the same functional form as the diffuse illumination term $\max(n \cdot u_{1i}, m_{1i})$, and therefore, using vector-based computer hardware, such as VPU 313 of FIG. 3, the vector dot products for the diffuse and specular terms can be evaluated in parallel, providing an efficient means of computing the specular terms. Compared to the computation of the diffuse terms alone, very little overhead is needed to compute the specular and diffuse terms together. In addition, since summation is not a very costly operation, little overhead is needed to sum the specular and diffuse terms in computing the color vector c, since instead of summing M diffuse terms, a sum is made over M diffuse terms and M specular terms.

In addition, if for each light source i 610, the light source direction vector $l_i$ 605, the observer vector v 630, the shininess index n, the color of the light $c_i$, and the diffuse and specular reflection coefficients $k_d$, $k_s$, respectively, are constant over surface 620 of object 670, which is a valid assumption for certain circumstances such as when light source i 610 and observer 635 are placed far from object 670, then variables $u_{1i}$, $m_{1i}$, $c_{1i}$, $u_{2i}$, $m_{2i}$, and $c_{2i}$ only need to be calculated once for each light source i 610. Consequently, the additional cost introduced by the calculation of the specular and diffuse terms in comparison to the calculation of only the diffuse terms is very negligible, since the calculation of the specular and diffuse reflected light from every point on surface 620 of object 670 only involves a parallel computation of the vector dot products and a sumation of 2M diffuse and specular terms given M light sources. The calculation does not involve a computation of variables $u_{1i}$, $m_{1i}$, $c_{1i}$, $u_{2i}$, $m_{2i}$, and $c_{1i}$ at every point on surface 620 of object 670 for each light source i 610. In other words, for a given light source i 610, the unit vector n 615 is the only component of the color equation that is variable over surface 620 of object 670, and hence the calculation of the specular terms are "almost free" in comparison to the calculation of the diffuse terms alone.

As illustrated in FIGS. 4A–4D, specular intensity function S(n,h,n) 410 of the present invention is not continuous in the first derivative. That is, there is a discontinuity in the first derivative of S with respect to $\theta_{nh}$ when S=0. Since S=1−n+max{n·nh, n−1}, the discontinuity occurs when n·nh=n−1, or when cos $\theta_{nh}$=1−1/n. For example, referring to FIG. 4A, the discontinuity in the first derivative of S with respect to $\theta_{nh}$ for n=3 occurs when cos $\theta_{nh}$=1−1/3, or in other words, when $\theta_{nh}$=∓48.2 degrees. In order to more closely approximate the prior art specular intensity function g(n,h,n) 420, a modified specular intensity function $SM_2$(n,h,n)≡$S^2$(n,h,n/2) is defined according to the present invention. Modified specular intensity function $SM_2$(n,h,n) has a continuous first derivative. However, the modified specular intensity function $SM_2$(n,h,n) has discontinuous higher order derivatives. For example, the second order derivative is discontinuous. Another modified specular intensity function according to the present invention, $SM_3$(n,h,n)≡$S^3$(n,h,n/3), has continuous first and second order derivatives, but has discontinuous higher order derivatives. In fact, the modified specular intensity function $SM_k$(n,h,n)≡$S^k$(n,h,n/k)=$(1-n/k+\max\{n\cdot(n/k\ h),\ n/k-1\})^k$ of the present invention, where 2≦k≦n, has continuous derivatives up to and including the (k−1)th order derivative. For k=n, the modified specular intensity function $SM_n$(n,h,n)=max{n·h, 0}$^n$=cos$^n$ $\theta_{nh}$, and is equivalent to the prior art specular intensity function g(n,h,n) 420. Therefore, the modified specular intensity function $SM_k$(n,h,n) according to the present invention, where 2≦k≦n, can more closely approximate the prior art specular intensity function g(n,h,n) 420 by increasing the value of k.

Referring to FIG. 6, the modified specular intensity function is defined for an object illuminated by a plurality of light sources, where $SM_{i,k}$(n,$h_i$,n)=$(1-n/k+\max\{n\cdot(n/k\ h_i),\ n/k-1\})^k$ is the modified specular intensity function for the object 670 illuminated by the $i^{th}$ light source 610.

Figure 8A:
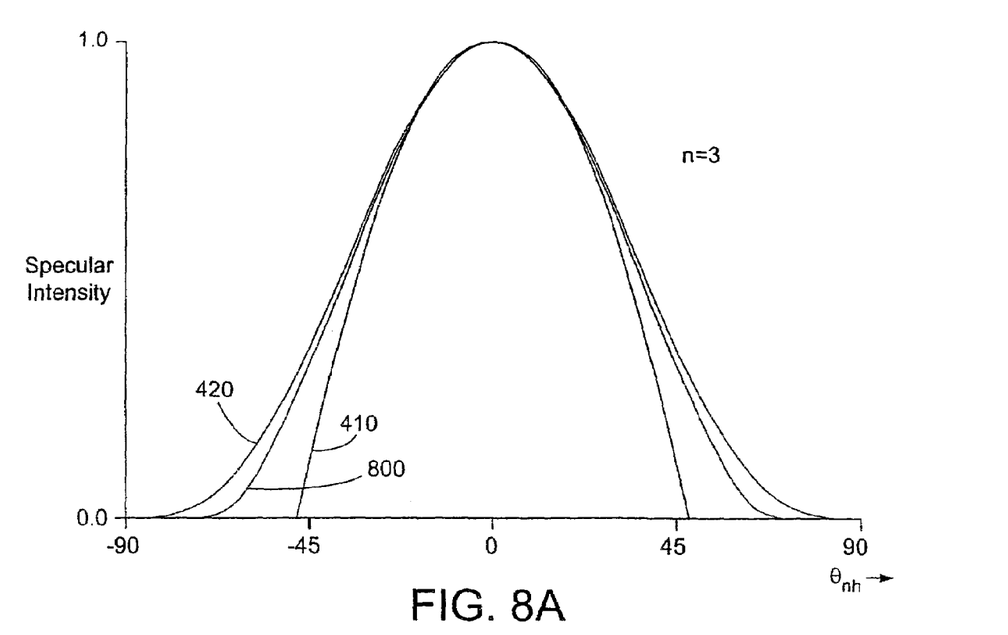
FIG. 8A is a graph of the prior art specular intensity function g(n,h,n), the specular intensity function S(n,h,n) according to the invention, and the modified specular intensity function $SM_2$(n,h,n) according to the invention, for n=3.
Figure 8B:
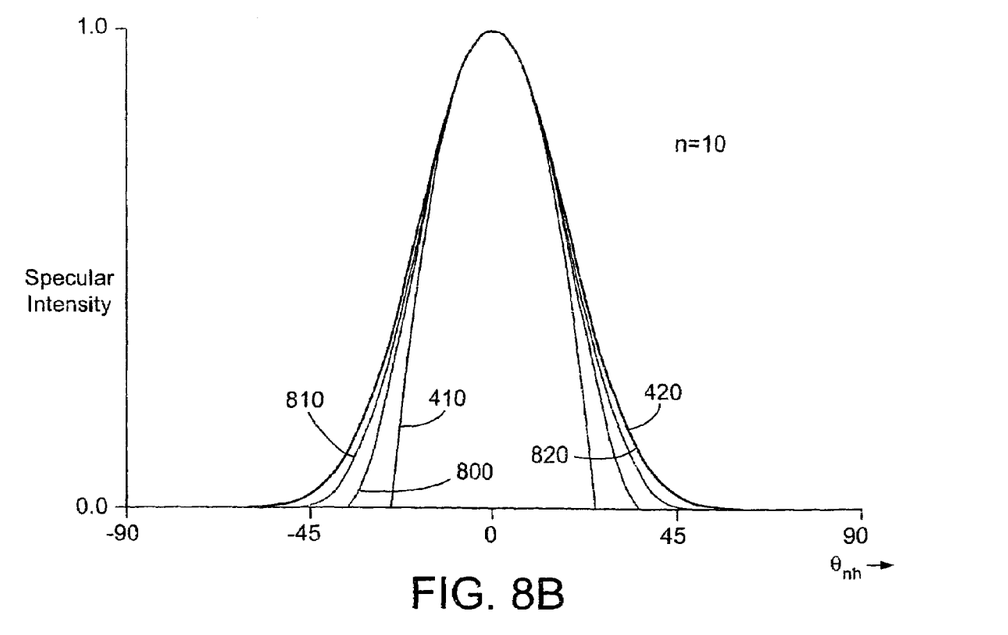
FIG. 8B is a graph of the prior art specular intensity function g(n,h,n), the specular intensity function S(n,h,n) according to the invention, the modified specular intensity function $SM_2$(n,h,n) according to the invention, the modified specular intensity function $SM_4$(n,h,n) according to the invention, and the modified specular intensity function $SM_8$(n,h,n) according to the invention, for n=10.
Figure 8C:
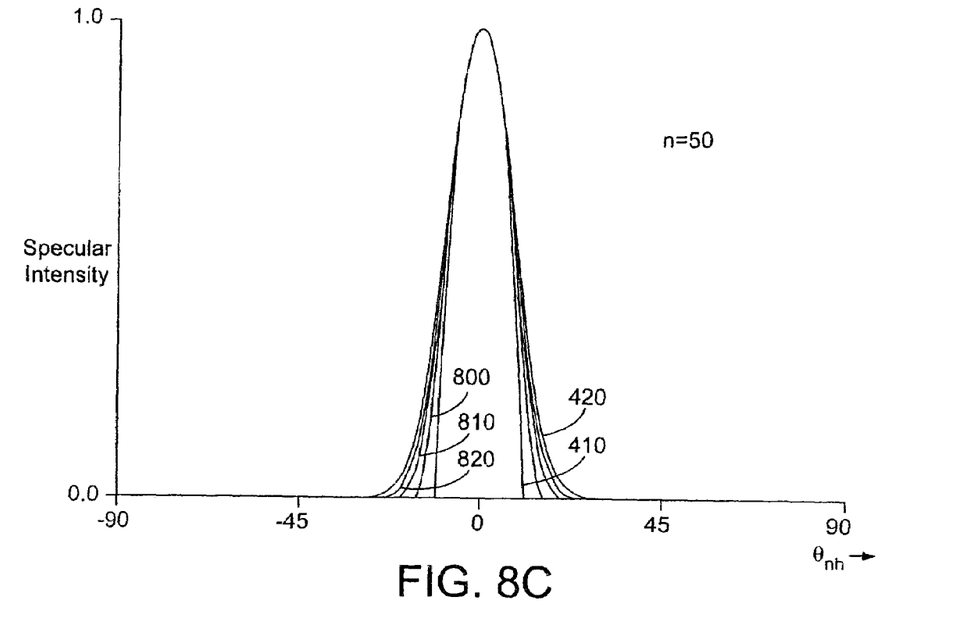
FIG. 8C is a graph of the prior art specular intensity function g(n,h,n), the specular intensity function S(n,h,n) according to the invention, the modified specular intensity function $SM_2$(n,h,n) according to the invention, the modified specular intensity function $SM_4$(n,h,n) according to the invention, and the modified specular intensity function $SM_8$(n,h,n) according to the invention, for n=50.
Figure 8D:
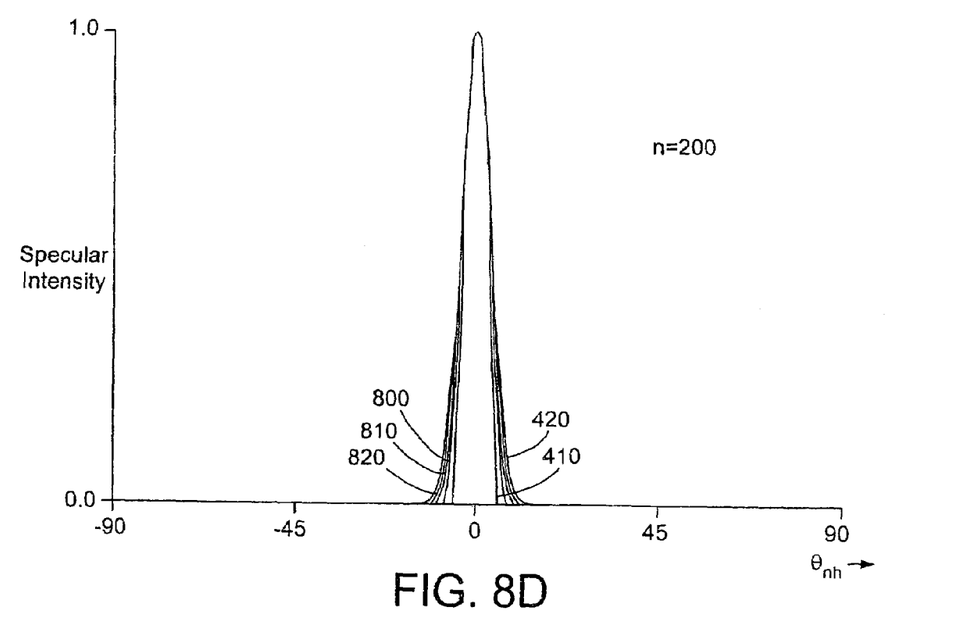
FIG. 8D is a graph of the prior art specular intensity function g(n,h,n), the specular intensity function S(n,h,n) according to the invention, the modified specular intensity function $SM_2$(n,h,n) according to the invention, the modified specular intensity function $SM_4$(n,h,n) according to the invention, and the modified specular intensity function $SM_8$(n,h,n) according to the invention, for n=200.

FIG. 8A is a graph of the prior art specular intensity function g(n,h,n) 420, the specular intensity function S(n,h,n) 410 of the present invention, and the modified specular intensity function $SM_2$(n,h,n) 800 of the present invention, for parameter n=3. Similarly, each of FIGS. 8B-8D is a graph of the prior art specular intensity function g(n,h,n) 420, the specular intensity function S(n,h,n) 410 of the present invention, the modified specular intensity function $SM_2$(n,h,n) 800 of the present invention, the modified specular intensity function $SM_4$(n,h,n) 810 of the present invention, and the modified specular intensity function $SM_8$(n,h,n) 820 of the present invention, where n=10 in FIG. 8B, n=50 in FIG. 8C, and n=200 in FIG. 8D. Each of FIGS. 8A–8D illustrate that as the parameter k of the modified specular intensity function $SM_k$(n,h,n) increases, the graph of function $SM_k$(n,h,n) approaches the graph of the prior art specular intensity function g(n,h,n) 420. In addition, the modified function $SM_2$(n,h,n) 800 has a continuous first-order derivative, the modified function $SM_4$(n,h,n) 810 has continuous derivatives up to third-order, and the modified function $SM_8$(n,h,n) 820 has continuous derivatives up to seventh-order. Therefore, the modified specular intensity function $SM_k$(n,h,n) can be used to more closely approximate the prior art specular intensity function g(n,h,n) 420, however, at a lower cost than computing the prior art specular intensity function g(n,h,n) 420. That is, $SM_k$(n,h,n) can be evaluated inexpensively when k is a small power of 2, by successive multiplications. As FIG. 8D illustrates for n=200, a good approximation to the prior art specular intensity function g(n,h,n)∝cos$^{200}$ $\theta_{nh}$ is achieved by using the modified specular intensity function $SM_8$(n,h,n) 820 according to the present invention. $SM_8$(n,h,n) 820 can be computed with three successive multiplications. For example, $SM_8$(n,h,n)=$f_2$(n,h,n/8)×$f_2$(n,h,n/8), where $f_2$(n,h,n/8)=$f_1$(n,h,n/8)×$f_1$(n,h,n/8), and where $f_1$(n,h,n/8)=S(n,h,n/8)×S(n,h,n/8). In contrast, the computation of the prior art specular intensity function g(n,h,n)∝cos$^{200}$ $\theta_{nh}$ requires exponentiation to the $200_{th}$ power, which is a more costly computation.

The invention has been explained above with reference to preferred embodiments. Other embodiments will be apparent to those skilled in the art in light of this disclosure. The present invention may readily be implemented using configurations other than those described in the preferred embodiments above. For example, the program including the illumination model, according to the invention, may be executed in part or in whole by the CPU, the VPU, the GPU, or a rendering engine (not shown). Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A method for computing the intensity of specularly reflected light, comprising the steps of:

representing the intensity of light reflected specularly from an object illuminated by a plurality of light sources by an algebraic expression, wherein the algebraic expression is $S_i$ (n,$h_i$,n)=1−n+max{n·($nh_i$), n−1}, which describes the intensity of light reflected from a point on the object as measured by an observer, the object illuminated by light from an $i^{th}$ light source, where n is a unit vector normal to the object at the point of reflection, $h_i$ is a unit vector bisecting an angle subtended by a unit vector pointing towards the $i^{th}$ light source from the point of reflection and a unit vector pointing towards the observer from the point of reflection, and n is a parameter that describes the shininess of the object;

incorporating the algebraic expression into an illumination model for the illumination of the object, the model having at least specular illumination terms and diffuse illumination terms; and expressing the specular illumination terms of the illumination model in the same functional form as other terms of the illumination model, wherein the specular illumination terms and the diffuse illumination terms are evaluated substantially in parallel.

2. The method of claim 1, wherein the algebraic expression does not include division or exponentiation operators.

3. The method of claim 1, wherein the plurality of light sources includes extended light sources and point light sources.

4. The method of claim 1, wherein the illumination model describes the color and intensity of light reflected from the object illuminated by the $i^{th}$ light source, the reflected light including specular, diffuse, and ambient components.

5. The method of claim 4, wherein the other terms of the illumination model further comprise ambient terms.

6. The method of claim 1, wherein the specular illumination terms of the illumination model are expressed in the same functional form as the diffuse illumination terms of the illumination model.

7. A method for computing the intensity of specularly reflected light, comprising the steps of:
representing the intensity of light reflected specularly from an object illuminated by a plurality of light sources by an algebraic expression, wherein the algebraic expression is $SM_{i,k}(n,h_i,n)=(1-n/k+\max\{n\cdot(n/k\ h_i), n/k-1\})^k$, which describes the intensity of light reflected from a point on the object as measured by an observer, the object illuminated by light from an $i^{th}$ light source, where n is a unit vector normal to the object at the point of reflection, $h_i$ is a unit vector bisecting an angle subtended by a unit vector pointing towards the $i^{th}$ light source from the point of reflection and a unit vector pointing towards the observer from the point of reflection, n is a parameter that describes the shininess of the object, and k is a parameter that determines which derivatives of the algebraic expression are continuous;
incorporating the algebraic expression into an illumination model for the illumination of the object, the model having at least specular illumination terms and diffuse illumination terms; and
expressing the specular illumination terms of the illumination model in the same functional form as other terms of the illumination model, wherein the specular illumination terms and the diffuse illumination terms are evaluated substantially in parallel.

8. The method of claim 7, wherein $2 \leq k \leq n$.

9. A computer-readable medium comprising instructions for computing the intensity of specularly reflected light by performing the steps of:
representing the intensity of light reflected specularly from an object illuminated by a plurality of light sources by an algebraic expression, wherein the algebraic expression is $S_i(n,h_i,n)=1-n+\max\{n\cdot(nh_i), n-1\}$, which describes the intensity of light reflected from a point on the object as measured by an observer, the object illuminated by light from an $i^{th}$ light source, where n is a unit vector normal to the object at the point of reflection, $h_i$ is a unit vector bisecting an angle subtended by a unit vector pointing towards the $i^{th}$ light source from the point of reflection and a unit vector pointing towards the observer from the point of reflection, and n is a parameter that describes the shininess of the object;
incorporating the algebraic expression into an illumination model for the illumination of the object, the model having at least specular illumination terms and diffuse illumination terms; and
expressing the specular illumination terms of the illumination model in the same functional form as other terms of the illumination model, wherein the specular illumination terms and a diffuse terms are evaluated substantially in parallel.

10. The computer-readable medium of claim 9, wherein the algebraic expression does not include division or exponentiation operators.

11. The computer-readable medium of claim 9, wherein the plurality of light sources includes extended light sources and point light sources.

12. The computer-readable medium of claim 9, wherein the illumination model describes the color and intensity of light reflected from the object illuminated by the $i^{th}$ light source, the reflected light including specular, diffuse, and ambient components.

13. The computer-readable medium of claim 12, wherein the other terms of the illumination model further comprise ambient terms.

14. The computer-readable medium of claim 9, wherein the specular illumination terms of the illumination model are expressed in the same functional form as the diffuse illumination terms of the illumination model.

15. A computer-readable medium comprising instructions for computing the intensity of specularly reflected light by performing the steps of:
representing the intensity of light reflected specularly from an object illuminated by a plurality of light sources by an algebraic expression, wherein the algebraic expression is $SM_{i,k}(n,h_i,n)=(1-n/k+\max\{n\cdot(n/k\ h_i), n/k-1\})^k$, which describes the intensity of light reflected from a point on the object as measured by an observer, the object illuminated by light from an $i^{th}$ light source, where n is a unit vector normal to the object at the point of reflection, $h_i$ is a unit vector bisecting an angle subtended by a unit vector pointing towards the $i^{th}$ light source from the point of reflection and a unit vector pointing towards the observer from the point of reflection, n is a parameter that describes the shininess of the object, and k is a parameter that determines which derivatives of the algebraic expression are continuous;
incorporating the algebraic expression into an illumination model for the illumination of the object, the model having at least specular illumination terms and diffuse illumination terms; and
expressing the specular illumination terms of the illumination model in the same functional form as other terms of the illumination model, wherein the specular illumination terms and a diffuse terms are evaluated substantially in parallel.

16. The computer-readable medium of claim 15, wherein $2 \leq k \leq n$.

17. An electronic entertainment system for computing the illumination of an object by a plurality of light sources, comprising:
a memory configured to store game instructions and an illumination model;
a processor configured to execute game instructions and generate rendering instructions;
a vector processor configured to calculate color vectors using the illumination model, the illumination model having specular illumination terms and diffuse illumination terms expressed in the same functional form, wherein the vector processor evaluates vector dot products for the diffuse and specular illumination terms substantially in parallel; and
a graphics processor configured to render the illuminated object in an image using the color vectors according to the rendering instructions,
wherein for each light source i, an algebraic expression representing the intensity of light reflected specularly from a point on the object and detected by an observer is substituted into the illumination model yielding a specular illumination term for the light source i, wherein the algebraic expression for light source i is $S_i(n,h_i,n)=1-n+\max\{n\cdot(nh_i), n-1\}$, where n is a unit vector normal to the object at the point of reflection, $h_i$ is a unit vector bisecting an angle subtended by a unit vector pointing towards light source i from the point of reflection and a unit vector pointing towards the observer from the point of reflection and n is a parameter that describes the shininess of the object.

18. The electronic entertainment system of claim 17, wherein the algebraic expression does not contain division or exponentiation operators.

19. An electronic entertainment system for computing the illumination of an object by a plurality of light sources, comprising:
   a memory configured to store game instructions and an illumination model;
   a processor configured to execute game instructions and generate rendering instructions;
   a vector processor configured to calculate color vectors using the illumination model, the illumination model having specular illumination terms and diffuse illumination terms expressed in the same functional form, wherein the vector processor evaluates vector dot products for the diffuse and specular illumination terms substantially in parallel; and
   a graphics processor configured to render the illuminated object in an image using the color vectors according to the rendering instructions,
   wherein for each light source i, an algebraic expression representing the intensity of light reflected specularly from a point on the object and detected by an observer is substituted into the illumination model yielding a specular illumination term for the light source i, wherein the algebraic expression for light source i is $SM_{i,k}(n,h_i,n)=(1-n/k+\max\{n\cdot(n/k\ h_i), n/k-1\})^k$, where k is a parameter that determines which derivatives of the algebraic expression are continuous, n is a unit vector normal to the object at the point of reflection, $h_i$ is a unit vector bisecting an angle subtended by a unit vector pointing towards light source i from the point of reflection and a unit vector pointing towards the observer from the point of reflection, and n is a parameter that describes the shininess of the object.

20. The electronic entertainment system of claim 19, wherein $2 \leq k \leq n$.

* * * * *